(12) United States Patent
Fujimoto et al.

(10) Patent No.: US 9,193,115 B2
(45) Date of Patent: Nov. 24, 2015

(54) METHOD OF MANUFACTURING AN OPTICAL ELEMENT

(71) Applicant: Konica Minolta Opto, Inc., Tokyo (JP)

(72) Inventors: Akihiro Fujimoto, Toyokawa (JP); Taisuke Oyanagi, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 554 days.

(21) Appl. No.: 13/680,951

(22) Filed: Nov. 19, 2012

(65) Prior Publication Data

US 2013/0119569 A1  May 16, 2013

Related U.S. Application Data

(62) Division of application No. 12/442,422, filed as application No. PCT/JP2007/067282 on Sep. 5, 2007, now abandoned.

(30) Foreign Application Priority Data

Sep. 29, 2006  (JP) ................................. 2006-268492

(51) Int. Cl.
| | |
|---|---|
| *B29D 11/00* | (2006.01) |
| *B32B 1/00* | (2006.01) |
| *B23B 5/36* | (2006.01) |
| *B23B 27/20* | (2006.01) |
| *B29C 33/42* | (2006.01) |
| *B29C 59/02* | (2006.01) |
| *B29C 45/37* | (2006.01) |
| *B29L 11/00* | (2006.01) |

(52) U.S. Cl.
CPC . *B29D 11/00* (2013.01); *B23B 5/36* (2013.01); *B23B 27/20* (2013.01); *B29C 33/42* (2013.01); *B32B 1/00* (2013.01); *B29C 45/37* (2013.01); *B29C 2059/023* (2013.01); *B29L 2011/00* (2013.01); *Y10T 29/49996* (2015.01)

(58) Field of Classification Search
None
See application file for complete search history.

(56) References Cited

U.S. PATENT DOCUMENTS

| | | | | |
|---|---|---|---|---|
| 4,451,892 A | * | 5/1984 | McMurtry | ..................... 700/192 |
| 5,067,284 A | * | 11/1991 | Putnam et al. | ................... 451/28 |
| 5,995,286 A | | 11/1999 | Mukai et al. | |
| 6,008,942 A | | 12/1999 | Ogusu et al. | |

(Continued)

FOREIGN PATENT DOCUMENTS

| | | |
|---|---|---|
| EP | 0 441 206 | 8/1991 |
| JP | 2004-021077 | 1/2004 |

(Continued)

OTHER PUBLICATIONS

English Translation of an Office Action dated Jan. 22, 2013 issued in the corresponding Taiwanese Patent Application No. 096135748.

(Continued)

*Primary Examiner* — Benjamin Schiffman
(74) *Attorney, Agent, or Firm* — Cozen O'Connor

(57) ABSTRACT

A method for manufacturing an optical element including: a surface including a plurality of grooves arranged concentrically. Each of the grooves includes a bottom surface with a predetermined width, a side surface, and a curved surface with a predetermined curvature radius. The bottom surface extends in a radius direction of the grooves. The curved surface connects the bottom surface and the side surface.

6 Claims, 8 Drawing Sheets

(56) References Cited

U.S. PATENT DOCUMENTS

| | | | |
|---|---|---|---|
| 7,178,433 B2 * | 2/2007 | Matsuda et al. | 82/1.11 |
| 7,686,988 B2 * | 3/2010 | Hosoe | 264/2.5 |
| 7,788,998 B2 * | 9/2010 | Ethington et al. | 82/123 |
| 8,662,959 B2 * | 3/2014 | Kuriyama et al. | 451/28 |
| 2004/0217496 A1 | 11/2004 | Matsuda et al. | |
| 2005/0008889 A1 | 1/2005 | Hayashi et al. | |

FOREIGN PATENT DOCUMENTS

| | | |
|---|---|---|
| JP | 2004-344994 | 12/2004 |
| JP | 2005-219185 | 8/2005 |
| JP | 2005-219187 | 8/2005 |
| JP | 2005-319778 | 11/2005 |
| TW | 457190 | 10/2001 |
| TW | 200507969 | 2/2004 |
| TW | 200624394 | 7/2006 |

OTHER PUBLICATIONS

Office Action dated Jul. 24, 2013 issued in the corresponding Korean Patent Application No. 10-2009-7006094.

European Patent Office Search Report dated Feb. 12, 2012 in corresponding EPO application No. EP07806725.

* cited by examiner

METHOD OF MANUFACTURING AN OPTICAL ELEMENT

RELATED APPLICATIONS

This is a division of U.S. patent application Ser. No. 12/442,422 filed on Mar. 23, 2009 which is a U.S. National Phase under 35 U.S.C. §371 of International Application PCT/JP2007/067282 filed on Sep. 5, 2007 which claims priority to Japanese Patent Application No. 2006-268492 filed Sep. 29, 2006, the entire contents of all of which are hereby incorporated by reference.

TECHNICAL FIELD

The present invention relates to a mold, an optical element, a method of manufacturing a mold for forming an optical element. In particular, the present invention relates to a mold appropriate for processing a mold for forming an optical element, an optical element formed by the aforesaid mold, and a method for manufacturing the mold for forming an optical element.

BACKGROUND ART

In recent years, in a highly accurate optical element such as an objective lens for an optical pickup apparatus, a diffractive structure is formed on its optical surface to improve an optical property by its diffractive effects. In this case, the diffractive structure is generally a microscopic structure of ring-shaped zones. When an objective lens is formed through injection molding with plastic as a material, it is necessary to process the mold to form a microscopic-groove form that corresponds to the structure of ring-shaped zones on its mold. As a material for the mold, cemented carbide is generally used, and this cemented carbide can be cut by a diamond cutting tool. Patent Literature 1 discloses a technology wherein a material of the mold is cut by a diamond cutting tool having a rectangular cutting face while the material is rotated, to form the microscopic-groove form.

Patent Literature 1: Unexamined Japanese Patent Application Publication No. 2005-219185

DISCLOSURE OF INVENTION

In this technology, when cutting force is applied on a cutting face of the diamond cutting tool, there is a problem that a tip corner portion of the tool tends to cleave in the direction of 45° and to be chipped off due to crystal orientation of diamond. In the technology of Patent Literature 1, when the corner portion of the cutting face is chipped off, a surface inclining at 45° that follows a shape of the chipped portion is generated between a bottom surface of the groove and a side surface of the groove. When optical elements are molded through the mold having a groove shape of this kind, deformation is caused to follow the surface including at 45° on the diffractive structure, which results in a fear of a decline of diffraction efficiency. On the other hand, the cleavage does not sometimes appear depending on a diamond cutting tool. In that case, the surface inclining at 45° is not caused on the mold which is processed and formed by the tool. Further, deformation is not caused on a diffractive structure of an optical element molded by the aforesaid mold, thus, diffraction efficiency can be kept to be high. Namely, in the prior art, accuracy of a mold varies by cleavage of a diamond tool that is an unexpected phenomenon, which causes a problem that optical property (diffraction efficiency) of optical elements varies greatly depending on molds. On the other hand, it is possible to consider that the target maximum value of diffraction efficiency owned by an optical element is determined to be low in advance. However, it is difficult to fundamentally solve the aforesaid variation caused by cleavage of the tool to be low.

The present invention is achieved in view of the aforesaid problems and is to provide a mold, an optical element, and a method of manufacturing a mold for forming an optical element, whereby necessary efficiency is secured, for example, in optical elements equipped with diffractive structures and whereby variation in the formed products caused in each mold for manufacturing the optical elements can be controlled.

The above objects are achieved by embodiments described below.

1. A mold for forming an optical element including a plurality of ring-shaped zones, the mold comprising:

a surface comprising a plurality of ring-shaped zones arranged concentrically, wherein each of the ring-shaped zones comprises a groove comprising a bottom surface having a predetermined width extending in a radius direction of the ring-shaped zones, a side surface, and a curved surface with a curvature radius in a range from 0.5 µm to 2 µm connecting the bottom surface and the side surface.

According to the mold relating to the present invention, ring-shaped zones with the following structures are formed on a mold in at least a first cutting process with, for example, a diamond cutting tool. Each of the ring-shaped zones includes a groove bottom surface and a groove side surface which are connected through a curved surface with a curvature radius in a range from 0.5 µm to 2 µm. It secures a required optical property of an optical element formed through a transfer process with the mold. Further, it reduces a change of a curvature radius of the curved surface between the start and the end of the cutting process, and controls a variation of optical elements molded by the molds processed as above depending on the molds. Herein, "curvature radius" represents a value measured on a cross section along the optical axis. Further, "comprising a bottom surface (or top portion), a side surface, and a curved surface with a curvature radius in a range from 0.5 µm to 2 µm connecting the bottom surface and the side surface" described above not only means that all of the plurality of ring-shaped zones which are formed as above are constructed by curved surfaces, but also means that curved surfaces connect the surfaces in a part of the ring-shaped zones, because of an usable efficiency. For example, said curved surfaces may connect the surfaces in 50% or more of the whole ring-shaped zones.

2. The mold of Item 1, wherein the bottom surface is formed in a shape with a plurality of steps.

The above mold is preferable to form a groove structure in which ring-shaped zones in stair shape are repeatedly arranged around optical axis X as shown in FIG. 1(a).

3. The mold of Item 1, wherein the bottom surface does not comprise a step.

The above mold is preferable to form a groove structure in which a plural side walls with the same height forming ring-shaped zones are arranged around optical axis X as shown in FIG. 1(b).

4. An optical element comprising:

an optical surface comprising a plurality of ring-shaped zones formed concentrically around an optical axis, each of the ring-shaped zones comprising a top portion having a predetermined width extending in a direction perpendicular to the optical axis, a side surface, and a curved surface with a curvature radius in a range from 0.5 µm to 2 µm connecting the top portion and the side surface.

An optical element according to the present invention can be formed with a mold described in Item 1, thus, exhibits the same action and effect to the mold.

5. The optical element of Item 4, wherein each of the ring-shaped zones comprises a stepped structure formed in a stair shape.

As for the optical element described in Item 5, each of the plurality of ring-shaped zones in the embodiment described in Item 4 includes a stepped structure formed in a stair shape. A stepped structure formed in a stair shape means a structure in which ring-shaped zones in stair shape are repeatedly arranged around optical axis X as shown in FIG. 1(a).

6. The optical element of Item 4,
wherein each of the ring-shaped zones is formed in a binary structure.

As for the optical element described in Item 6, each of the plurality of ring-shaped zones in the embodiment described in Item 4 is formed in a binary structure. A binary structure means a structure in which a plural side walls with the same height forming ring-shaped zones are arranged around optical axis X as shown in FIG. 1(b).

7. A method for manufacturing a mold for forming an optical element, the mold comprising a mold base-material on which a plurality of grooves are formed concentrically by relatively driving a diamond cutting tool and the mold base-material for cutting the mold base-material, the diamond cutting tool comprising a cutting edge with a cutting face and a flank, the mold base-material being driven to be rotated, each of the grooves comprising a bottom surface having a predetermined width extending in a radius direction of the grooves, the method comprising:

a first step of cutting the mold base-material while relatively driving the diamond cutting tool or the mold base-material in a direction of a rotation axis of the mold;

a second step of cutting the mold base-material while relatively driving the diamond cutting tool or the mold base-material in a direction perpendicular to the rotation axis of the mold; and a third step of cutting the mold base-material by displacing the diamond cutting tool or the mold base-material simultaneously in a direction of the rotation axis of the mold and a direction perpendicular to the rotation axis of the mold while relatively driving the diamond cutting tool or the mold base-material, between the first and the second steps.

The manufacturing method relating to the present invention, includes the third step of cutting the mold base-material by displacing the diamond cutting tool or the mold base-material simultaneously in a direction of the rotation axis of the mold and a direction perpendicular to the rotation axis of the mold while relatively driving the diamond cutting tool or the mold base-material, between the first and the second steps. Therefore, a predetermined surface crossing the bottom surface and the side surface of a groove can be formed at the intersection of the bottom surface and the side surface. It reduces a change of a curvature radius of the curved surface between the start and the end of the cutting process, and controls a variation of optical elements molded by the molds processed as above depending on the molds.

8. The method of Item 7 for manufacturing a mold for forming an optical element, wherein the mold base-material is cut in the third step such that the bottom surface and a side surface are connected by a predetermined curved surface in the groove.

According to the embodiment described in Item 8, a change of a curvature radius of the curved surface between the start and the end of the cutting process can be reduced, and a variation of optical elements molded by the molds processed as above depending on the molds can be controlled.

9. The method of Item 8 for manufacturing a mold for forming an optical element, wherein a curvature radius of the curved surface is in a range from 0.5 µm to 2 µm.

The method described in Item 9 for manufacturing a mold for forming an optical element, according to the embodiment of Item 8, includes the curved surface with a curvature radius a range from 0.5 µm to 2 µm. It secures a required optical property of an optical element formed through transferring step with the manufactured mold for molding an optical element.

10. A method for manufacturing a mold for forming an optical element by relatively driving a diamond cutting tool and a mold base-material for cutting the mold base-material, the mold base-material being driven to be rotated, the diamond cutting tool comprising a cutting edge comprising a cutting face comprising a first edge portion, a second edge portion, and a third edge portion crossing the first edge portion and the second edge portion, each of the first edge portion and the second edge portion being in a line shape and extending parallel to each other, the mold comprising a mold base-material on which a plurality of grooves are arranged concentrically, each of the grooves comprising a bottom surface having a predetermined width extending in a radius direction of the grooves, the method comprising:

a first step of cutting the bottom surface of each of the grooves on the mold base-material by the third edge portion of the diamond cutting tool by relatively driving the diamond cutting tool or the mold base-material in a direction of the rotation axis of the mold;

a second step of cutting the side surface on the mold base-material by the second edge portion of the diamond cutting tool by relatively driving the diamond cutting tool or the mold base-material in a direction perpendicular to the rotation axis of the mold; and a third step of cutting the mold base-material by displacing the diamond cutting tool or the mold base-material simultaneously in the direction of the rotation axis of the mold and the direction perpendicular to the rotation axis of the mold, between the first and second steps.

In the manufacturing method relating to the invention, includes the third step of cutting the mold base-material by displacing the diamond cutting tool or the mold base-material simultaneously in a direction of the rotation axis of the mold and a direction perpendicular to the rotation axis of the mold while relatively driving the diamond cutting tool or the mold base-material, between the first and the second steps. Therefore, a curved surface crossing the bottom surface and the side surface of a groove can be formed at the intersection of the bottom surface and the side surface. It reduces a change of a curvature radius of the curved surface between the start and the end of the cutting process, and controls a variation of optical elements molded by the molds processed as above depending on the molds.

As for "optical elements" herein, there are given, for example, a lens, a prism, a diffractive grating optical element (diffractive lens, diffractive prism, diffractive plate and chromatic aberration correcting element), an optical filter (spatial lowpass filter, wavelength bandpass filter, wavelength lowpass filter, wavelength highpass filter and others), a polarization filter (analyzer, azimuth rotator, polarization separating prism or the like) and a phase filter (phase plate, hologram or the like), to which, however, the invention is not limited.

In the invention, it is possible to provide a mold, an optical element, and a method of manufacturing a mold for molding an optical element, which are epochal not to be obtained by the prior art and which can control variation of, for example, optical elements with diffractive structures caused per respective molds for molding the optical elements, while securing required efficiency in the optical elements.

BRIEF DESCRIPTION OF DRAWINGS

Each of FIG. 1(a)

Each of enlarged

BEST MODE FOR CARRYING OUT THE INVENTION

Figure 2:
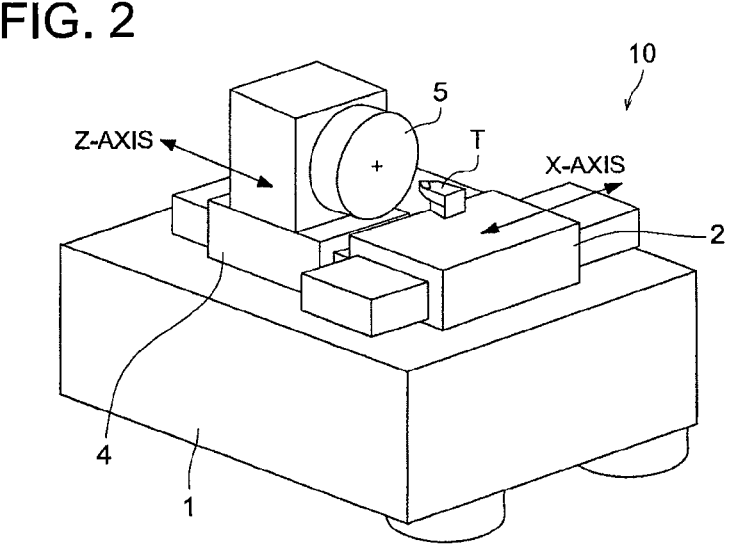
FIG. 2 is a perspective view of biaxial superfine processing machine 10 that is suitable for carrying out a method of processing a mold relating to the present embodiment.
Figure 3:
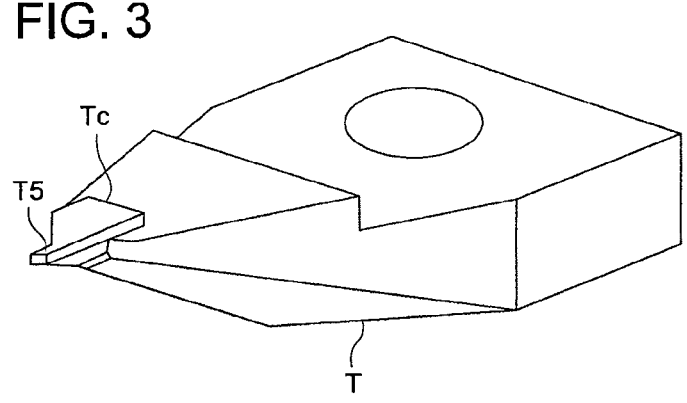
FIG. 3 is a perspective view of a diamond cutting tool.

An embodiment of the invention will be explained as follows, referring to the drawings. FIG. 2 is a perspective view of biaxial superfine processing machine 10 that is suitable for carrying out a method of processing a mold relating to the present embodiment, and FIG. 3 is a perspective view of a diamond tool. In the biaxial superfine processing machine 10 shown in FIG. 2, X-axis table 2 that is driven in the X-axis direction by an unillustrated control device is arranged on pedestal 1. On the X-axis table 2, there is mounted diamond cutting tool T. Further, Z-axis table 4 that is driven in the Z-axis direction by an unillustrated control device is arranged on pedestal 1. On Z-axis table 4, there is mounted main shaft (rotation axis) 5 that is driven to be rotated by an unillustrated control device. On the main shaft 5, a mold for forming optical elements each having a transfer optical surface to be processed, can be mounted. The diamond cutting tool T is equipped on its tip with diamond chip Tc whose shape will be explained later with referring to FIGS. 4(a) and 4(b).

A processing method relating to the present embodiment makes it possible to create grooves in a form of ring-shaped-zones corresponding to the diffractive structure by conducting cutting process in the ductility mode under the conditions wherein a superfine processing machine whose main shaft 5 and X/Z axes tables 2 and 4 are stiff extremely and shaft control resolving power is 100 nm or less is used, then, a mold for molding optical elements representing a work is clamped on the main shaft 5, and the main shaft 5 is rotated at a rotating speed 1000 $\text{min}^{-1}$ so that a cutting point of a cutting blade may be moved continuously in the course of processing by diamond cutting tool T on conditions of an amount of cutting of 1 μm and a feed mount of 0.2 mm/min.

Figure 4:
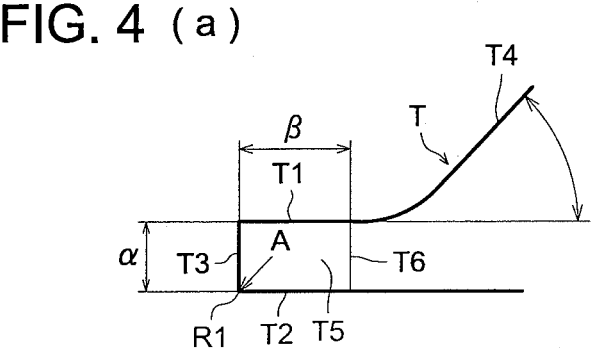
FIG. 4(a) is a diagram of diamond cutting tool T that is suitable to be used for a processing method relating to the invention that is viewed from a cutting face on the tip.
FIG. 4(b) is a side view of the foregoing.
Figure 4:
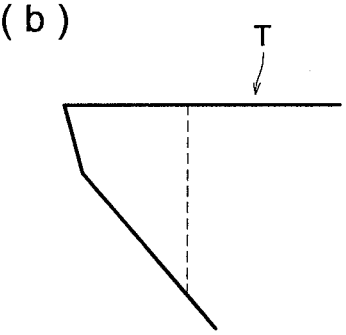

FIG. 4(a) is a diagram of diamond cutting tool T that is viewed from cutting face T5 at the tip thereof and is favorably used in a processing method for a mold relating to the present embodiment, and FIG. 4(b) is a side view of the diamond cutting tool T. In FIG. 4(a), the diamond cutting tool T has therein third edge portion T3 (100 μm or less) on the tip that linearly extends, and first edge portion T1 and second edge portion T2 which linearly extend in parallel from opposing ends of the third edge portion T3 in the direction perpendicular to the third edge portion T3. These edge portions form cutting face T5 in a rectangular form. The first edge portion T1 is connected to fourth edge portion T4 that extends to be away from the second edge portion T2. It is preferable that a straight edge portion of the second edge portion T2 and that of the third edge portion T3 intersect at right angles each other ideally, but both edge portions may be connected by a microscopic circular arc R1 with radius A (less than 0.5 μm). The rectangular form in this case is defined as an area surrounded by edge portions T1, T2, T3 and line T6, where the first edge portion T1 is shorter in the edge portions T1 and T2 which extend to be in parallel with each other, and the line T6 is drawn to be parallel to the third edge portion T3 from an end portion (position that is away from a tip by distance β) of the first edge portion T1 at the fourth edge portion T4 side.

Figure 5:
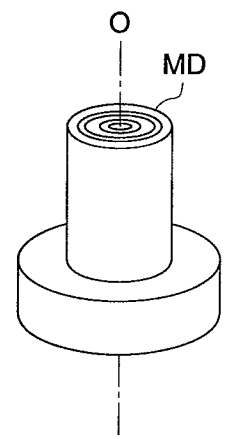
FIG. 5 is a perspective view of mold MD which has been processed by the diamond cutting tool shown in FIG. 4(a) and FIG. 4(b).
Figure 6:
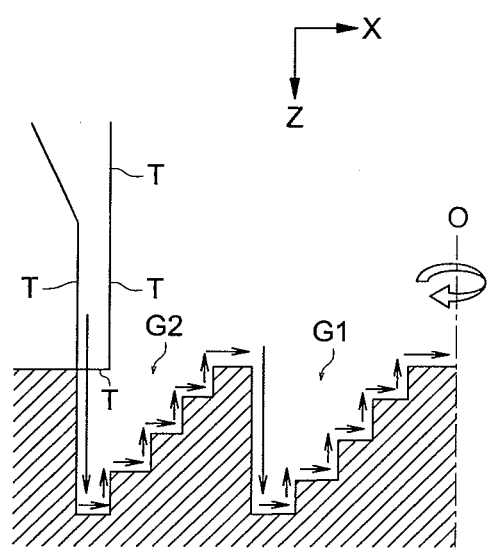
FIG. 6 is a schematic enlarged sectional view of an optical transfer surface of mold material M.
Figure 7A:
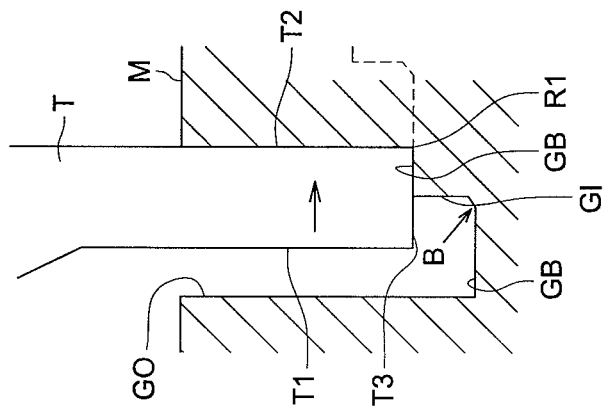
FIGS. 7(a)-7(c) shows a position of diamond cutting tool T in the case of processing.
Figure 7B:
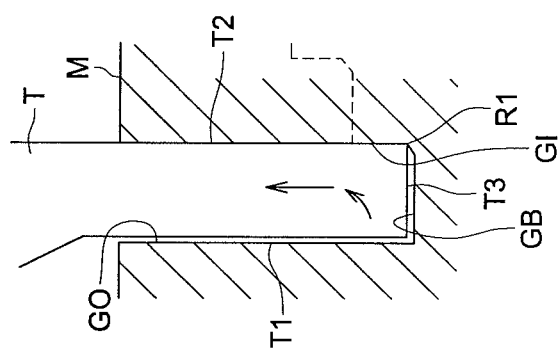
Figure 7C:
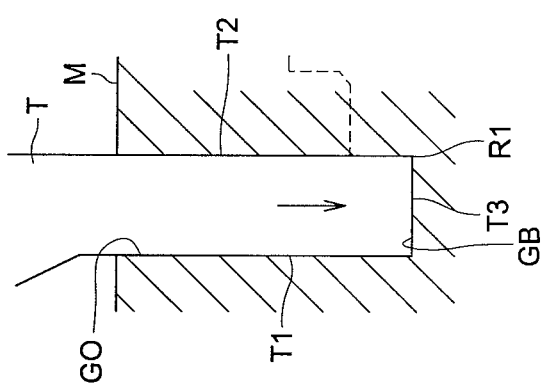

FIG. 5 is a perspective view of mold MD which has been processed by the diamond cutting tool shown in FIG. 4(a) and FIG. 4(b), and FIG. 6 is a schematic enlarged sectional view of an optical transfer surface of material M of the mold. Each of enlarged FIGS. 7(a)-7(c) shows a position of diamond cutting tool T in the case of processing. It is preferable that mold MD processed by a processing method of the present embodiment is used for forming optical elements each having a diffractive structure representing a structure wherein an optical functional surface on at least one side is divided into plural optical functional areas whose centers are on an optical axis, and at least one of the plural optical functional areas is divided into plural areas in a ring-shaped zones whose centers are on the optical axis, then, discontinuous steps in prescribed number are provided on each ring-shaped zone, and ring-shaped zones where discontinuous steps are provided are arranged continuously.

Figure 10:
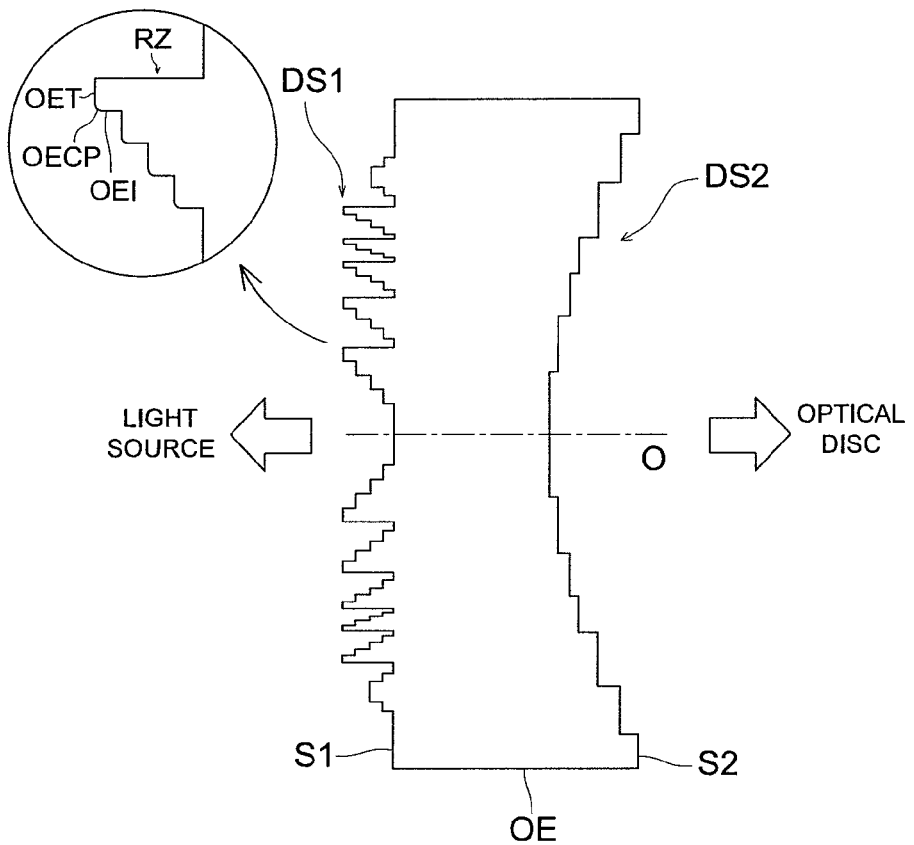
FIG. 10 is a sectional view for an example of optical element OE that can be used for an optical pickup apparatus.

FIG. 10 is a sectional view for an example of optical element OE that can be used for an optical pickup apparatus. A diffractive structure is drawn in exaggeration in the sectional view. In FIG. 10, diffractive structure DS1 and diffractive structure DS2 are formed respectively on optical surface S1 and optical surface S2 of optical element OE and exhibit diffractive effects for a light flux passing through the diffractive structures. The diffractive structures DS1 and DS2 are formed concentrically around optical axis O, and they are composed of ring-shaped zones each having a top portion with a predetermined width extending in the direction perpendicular to the optical axis. They have, for example, a stair shape on a cross section taken in the optical axis direction.

Grooves of ring-shaped zones are formed in stair shape with plural steps on an optical transfer surface of mold MD as shown in FIG. 6, so as to complement the aforesaid structures, where the optical transfer surface means a surface for transferring an optical surface of an optical element and this surface is preferably plated with nickel, phosphorus or copper. Incidentally, in FIG. 6, diamond cutting tool T is movable in X-axis direction (which is also referred as a direction toward the rotation axis) and in Z-axis direction (which is also referred as a direction parallel to the rotation axis of the mold).

An example of a processing method of the present embodiment will be described below. Processing in the present embodiment is effective when forming a groove structure in a shape of ring-shaped zone (which is also referred as grooves or grooves of ring-shaped zones simply) equipped with plural steps which become gradually deeper. Here, forms of groove structures to be formed on a mold are inputted in a control device of a superfine processing machine in advance. In the example shown in FIG. 6, groove structure G1 and groove structure G2 are formed on an optical transfer surface in order from optical axis O to the outer circumference. Steps in stair shape (which is also called as a staircase) of each of groove structure G1 and groove structure G2 becomes deeper toward the outer circumference. Herein, "shallow" or "deep" is relatively distinguished depending on a depth of cut in a direction of the rotation axis when the diamond cutting tool cuts the surface of a mold to be processed. Further, "cutting direction" is in parallel to the rotation axis and a direction to approach the mold.

When processing a mold, mold material M is rotated around optical axis O (which is also called a rotation axis line), and third edge portion T3 of diamond cutting tool T is moved to the prescribed position which is a standard position (the position shown with a solid line in FIG. 6) corresponding to the fourth step in groove structure G2 (the deepest step in groove structure G2) in this case, in the direction parallel to optical axis O and the direction to further press the tool against mold material M (downward direction along Z-axis). Owing to this, diamond cutting tool T cuts an optical transfer surface of mold material M to form grooves of a ring-shaped zone. Groove bottom surface (that is also referred as a bottom surface of the groove) GB is cut by third edge portion T3, while, groove side surface (that is also referred as a bottom wall surface of the groove) GO of outer circumstance side is cut by first edge portion T1 (First step: see FIG. 7(*a*)).

Next, as shown in FIG. 7(*b*), diamond cutting tool T is displaced in the direction intersecting optical axis O of mold material M (right direction along X-axis) and in rotation axis line direction (upward direction along Z-axis) simultaneously (Third step). In this operation, curved surface section CP is formed between groove bottom surface GB and groove side surface GI on the inner circumferential side due to circular arc section R1 between second edge portion T2 and third edge portion T3. Curvature radius of B of curved surface portion CP is in a range from 0.5 μm to 2 μm.

Figure 1:
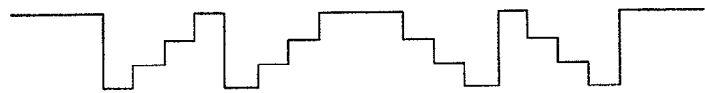
FIG. 1(b) shows an example of a diffractive structure.
Figure 1:

Further, diamond cutting tool T is displaced in parallel with optical axis O of mold material M (upward direction along Z-axis) to cut groove side surface GI at the inner circumferential side by the second edge portion T2 (Second step). After that, diamond cutting tool T is displaced in parallel to optical axis O of mold material M (right direction along X-axis), as shown in FIG. 7(*c*), to form the second-deepest step. The diamond cutting tool T is further displaced to form groove structures G2 and G1 in the same way. As is apparent from the foregoing, when the diamond cutting tool T is drawn out of mold material M and displaced in the X-axis direction each time a groove is formed repeatedly, it is possible to form mold MD that is suitable for forming a diffractive structure of a binary type (see FIG. 1(*a*)). A method of molding an optical element by using the mold MD of this kind is described, for example, in Unexamined Japanese Patent Application Publication No. 2005-319778.

For example, it is possible to obtain optical element OE1 shown in FIG. 10, by injecting melted material for an optical element into molds shown in FIG. 6 and FIGS. 7(*a*)-7(*c*) and by cooling it. When using a mold in which a plurality of ring-shaped zones having a stepped structure in a stair-shape or a binary structure are formed on an optical transfer surface, a plurality of ring-shaped zones RZ having a step structure in a stair-shape or a binary structure are transferred onto an optical surface of an optical element by this mold. As an example of an embodiment of the invention, there is shown a diagram that a cross section of a ring-shaped zone is enlarged, in a circle shown in FIG. 10. Each ring-shaped zone has top portion OET corresponding to groove bottom surface GB of a mold and side wall surface OEI corresponding to groove side surface GI of a mold. The top portion OET and the side wall surface OEI are connected by curved surface OECP that has a curvature radius in a range of 0.5-2 μm and that corresponds to curved surface portion CP of the mold. Further, the top portion has a predetermined width in the direction perpendicular to the optical axis. In the circle in FIG. 10, there is shown a sectional view of a step structure in stair-shape. However, it is not limited to the shape in FIG. 10, as far as a shape of the ring-shaped zone of the optical element relating to the invention includes a top portion having a predetermined width in the direction perpendicular to the optical axis, a side wall surface, and a curved surface having a curvature radius in a range of 0.5-2 μm which connects the top portion and the side wall surface.

Further, as a material of the optical element relating to the invention, it is possible to utilize a general glass optical material, without being limited to plastic.

An optical element relating to the invention may also be molded through press molding, injection molding, mold casting and other known molding method that molds an optical element, by using a mold relating to the invention.

In the meantime, in the course of cutting process, there is a fear that a corner of cutting face T5 of diamond cutting tool T is lost through cleavage by cutting resistance. In this case, a shape of lost cutting face T5 is transferred to mold material M. An optical element formed through transferring by the mold of this kind is feared that desired optical properties cannot be exhibited because the optical element has a diffractive structure that is different from a design shape. The problem, in particular, is variation in shapes of optical elements formed by plural molds, depending on the molds. Namely, it causes a fear that diffraction efficiency of an optical element molded by a certain mold is greatly different from diffraction efficiency of an optical element molded by another mold, resulting in an increase of percent defective.

In contrast to this, in the present embodiment, it is possible to lighten these troubles, because a groove bottom surface of a mold is connected to a groove side surface of a mold through a curved surface. This will be explained as follows, referring to the drawings, under the condition that a groove structure of a mold can be completely transferred with respect to a diffractive structure of an optical element.

Figure 8:
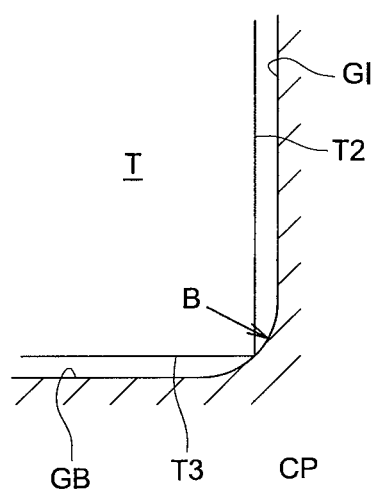
FIG. 8(a) shows an enlarged area around a groove bottom surface of a mold cut by a diamond cutting tool through a processing method of the present embodiment.
FIG. 8(b) shows an enlarged area around a groove side surface of a mold cut by a diamond cutting tool through a processing method of the present embodiment.
Figure 8:
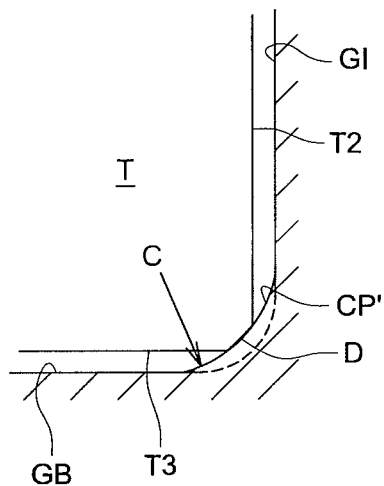
Figure 9:
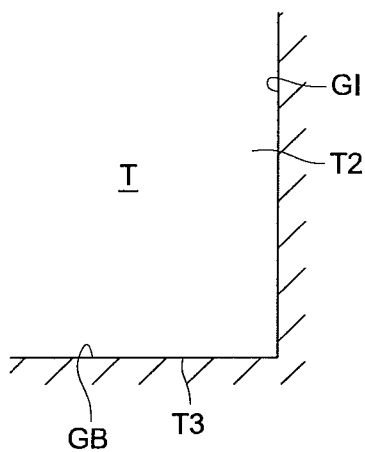
FIG. 9(a) shows an enlarged area around a groove bottom surface of a mold cut by a diamond cutting tool through a processing method in the comparative example.
FIG. 9(b) shows an enlarged area around a groove side surface of a mold cut by a diamond cutting tool through a processing method in the comparative example.
Figure 9:
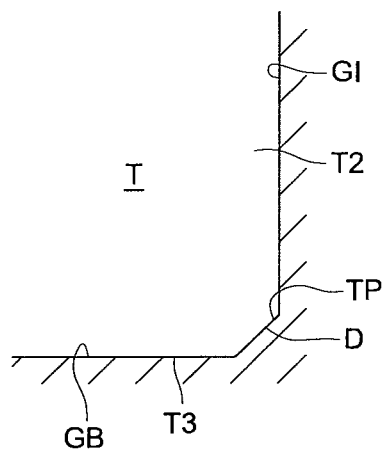

FIG. 8(*a*) shows an enlarged area around a groove bottom surface of a mold cut by a diamond cutting tool through a processing method of the present embodiment, while, FIG. 8(*b*) shows an enlarged area around groove side surface of a mold cut by a diamond cutting tool through a processing method of the present embodiment. FIG. 8(a) shows a groove at the start of cutting (the start of processing) and FIG. 8(b) shows a groove at the end of cutting (the end of processing). FIG. 9(a) shows an enlarged area around a groove bottom surface of a mold cut by a diamond cutting tool through a processing method of the comparative example, while, FIG. 9(b) shows an enlarged area around a groove side surface of a mold cut by a diamond cutting tool through a processing method of the comparative example. FIG. 9(a) shows a groove at the start of cutting (the start of processing) and FIG. 9(b) shows a groove at the end of cutting (the end of processing).

In FIGS. 8(a) and 8(b), in this case, a light flux which has passed through the optical surface on which the groove bottom surface GB is transferred, emerges at a desired diffraction angle, but a light flux which has passed through the optical surface on which the curved surface CP is transferred does not emerge at a desired diffraction angle, to become unwanted light. Therefore, it is preferable to make an area of curved surface CP to be zero originally, for enhancing diffraction efficiency of the optical element. The ideal groove structure of that kind (a form shown in FIG. 9(a)) can be acquired by cutting with diamond cutting tool T wherein second edge portion T2 and third edge portion T3 intersect each other through straight lines.

However, if chipped portion D appears in diamond cutting tool T during the period from the start to the end of cutting due to cleavage inclining to the third edge portion T3 in the direction of 45°, tapered surface TP wherein chipped portion D is transferred on the corner section appears in the groove structure at the end of cutting, as shown with a solid line in FIG. 9(b). In this case, a light flux passing through an optical surface on which the tapered surface TP is transferred, does not emerge at a desired diffraction angle and becomes unwanted light, thus, diffraction efficiency is lowered by an amount equivalent to the area of the tapered surface TP. This is a cause of occurrence of variation of diffraction efficiency before and after the occurrence of chipped portion D. Incidentally, there are circumstances that it cannot be judged whether the chipped portion D appears or not in the course of processing.

In contrast to this, in the present embodiment, curved surface CP shown in FIG. 8(a) is generated at the start of cutting, whereby, diffraction efficiency of optical elements formed through transferring the curved surface CP is lower than diffraction efficiency of optical elements formed through transferring by the mold of a groove structure shown in FIG. 9(a). However, a difference of an area viewed in the direction of a rotation axis line between curved surface CP before occurrence of the chipped portion D and curved surface CP' after occurrence of the chipped portion D is small. Therefore, variation of diffraction efficiency can be controlled in optical elements formed through transferring by the molds of that kind.

Incidentally, if curvature radius B of curved surface CP is increased, it reduces the difference of the area viewed in the direction of a rotation axis line between curved surface CP before occurrence of the chipped portion D and curved surface CP' after occurrence of the chipped portion D on a diamond cutting tool. Therefore, variation of light utilization efficiency (diffraction efficiency) for optical elements formed through transferring by the molds of that kind becomes smaller. In contrast to this, an absolute value of the light utilization efficiency for optical elements formed through transferring by the mold of that kind is lowered, because a difference of areas between curved surface CP and curved surface CP' in a shape (FIG. 9(a)) of the mold wherein a tool is not worn out and diffraction efficiency is 100%, becomes greater. It is therefore necessary to establish curved surface CP that restrains variation of light utilization efficiency, while securing the absolute value of light utilization efficiency that is necessary for optical elements.

When considering that a value of actual results of variation in an amount of abrasion of a diamond cutting tool is 0-0.5 μm, at least 0.5 μm of curvature radius of B of curved surface CP can reduce the variation of light utilization efficiency effectively. Further, if the curvature radius B is 2 μm or less, an absolute value of light utilization efficiency necessary for an optical element can be secured. Therefore, optical properties necessary for optical elements formed through transferring by the mold relating to the invention can be secured by making curvature radius B to be in the range of 0.5 μm-2 μm.

Figure 11:
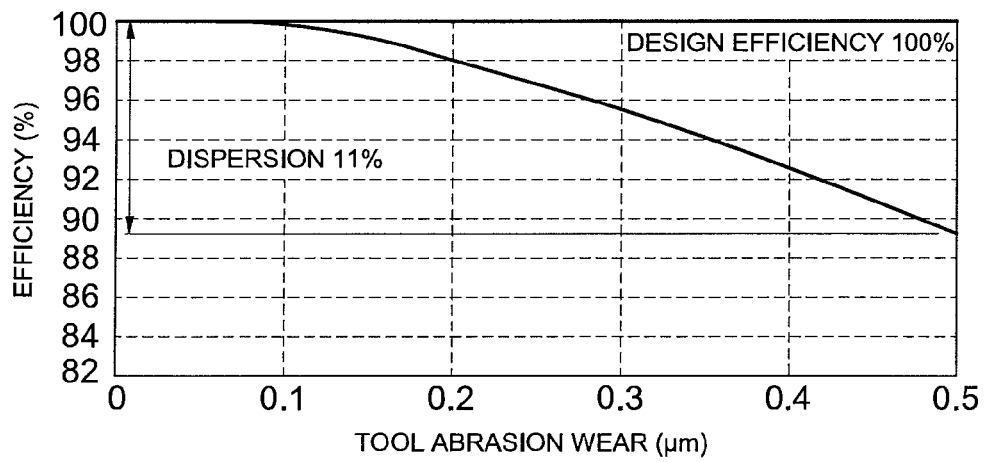
FIG. 11 is a diagram showing results of simulations conducted by inventors of the present invention.
Figure 12:
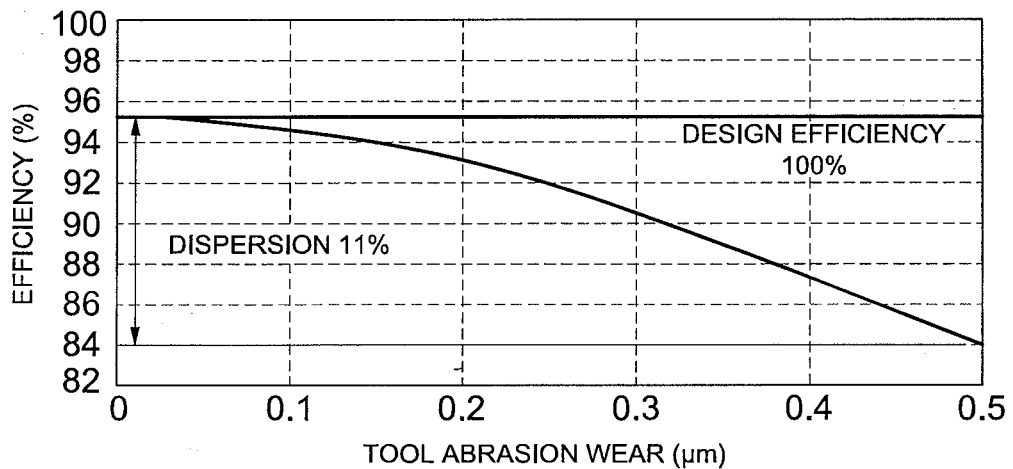
FIG. 12 is a diagram showing results of simulations conducted by inventors of the present invention.
Figure 13:
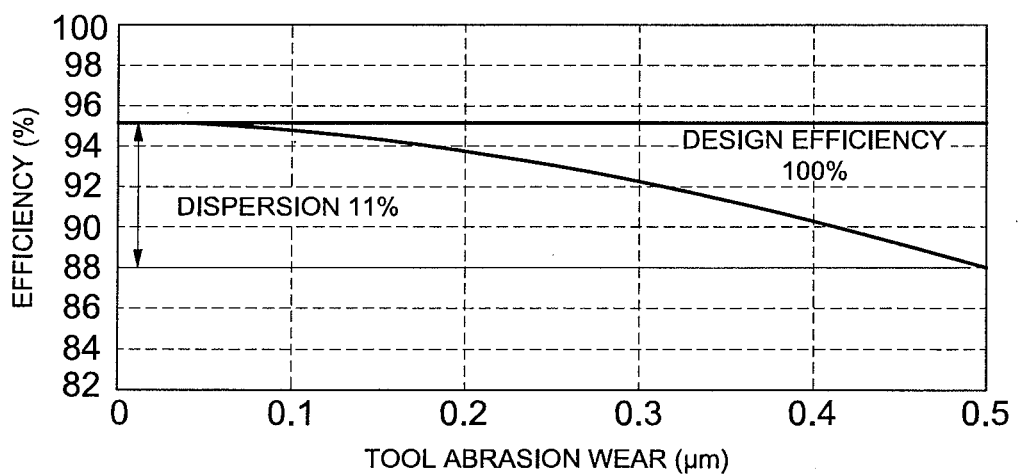
FIG. 13 is a diagram showing results of simulations conducted by inventors of the present invention.

Each of FIGS. 11, 12 and 13 is a diagram showing results of simulations carried out by the present inventors, and showing relationship between an amount of abrasion of the tool (a length of chipped portion of third edge portion T3) and diffraction efficiency of optical elements formed through transferring from a mold formed by the tool. FIG. 11 is the diagram of a mold in the conventional form, FIG. 12 is the diagram of a mold that is in a conventional form but is designed to lower the maximum diffraction efficiency of an optical element to 95%, and FIG. 13 is the diagram showing results of simulations wherein optical elements formed and transferred from the mold in the present embodiment are used. In the present simulation, curvature radius B was made to be 0.5 μm. Further, in FIGS. 11-12, the vertical axis represents diffraction efficiency (%) of optical elements, and the horizontal axis represents an amount of abrasion (μm) of the tool. As for optical elements formed through transferring from the mold of the comparative example shown in FIG. 9(a) and FIG. 9(b), diffraction efficiency under the state where no abrasion is caused (design efficiency) is 100% as shown in FIG. 11, but the diffraction efficiency varies as greatly as 11% if tool abrasion of 0.5 μm is caused. For this problem, it is also possible to consider the mold design in which the maximum diffraction efficiency of the optical element is lowered to restrain the variation of diffraction efficiency. However, the simulation conducted by inventors of the present invention clarified that the variation of diffraction efficiency in the case of tool abrasion of 0.5 μm remains to be 11% even when the mold is designed so that diffraction efficiency under the condition of no abrasion of tool (design efficiency) may be 95%, as shown in FIG. 12. The simulation further clarified that minimum diffraction efficiency is lowered and properties of optical elements are worsened. On the other hand, as for optical elements formed through transferring from the mold of the present embodiment shown in FIGS. 8(a) and 8(b), diffraction efficiency under the condition of no abrasion of tool (design efficiency) is 95%, and the variation of diffraction efficiency can be restrained to 7% even when tool abrasion of 0.5 μm is caused. It enhances overall diffraction efficiency and secures necessary optical properties, although the maximum diffraction efficiency is lowered slightly.

Though an explanation of the invention has been given by reference to the embodiment of the invention, the invention should not be construed to be limited to the aforesaid embodiment, and it is naturally possible to modify and improve properly. For example, the processing method relating to the invention can also be used for those other than processing of a mold for forming optical elements. Further, a shape of a cutting face of a diamond cutting tool used for the processing method of the invention may also be a tapered form without being a rectangular shape. Further, the mold may be processed by displacing a diamond cutting tool from an inner side to an outer side along the direction perpendicular to the optical axis and the rotation axis line.

The invention claimed is:

1. A method for manufacturing an optical element having an optical surface including a plurality of ring-shaped zones formed concentrically around an optical axis, comprising:
    preparing a mold for forming an optical element, wherein the mold comprises a mold base on which a plurality of first grooves are formed concentrically by relatively driving a diamond cutting tool and the mold base for cutting the mold base, the diamond cutting tool comprising a cutting edge with a cutting face and a flank, the mold base being driven to be rotated, each of the first grooves comprising a bottom surface having a predetermined width extending in a radius direction of the first grooves,
    providing the mold with a material of the optical element, and
    molding the material into the optical element,
    wherein the preparing step comprises:
        a first step of cutting the mold base while relatively driving the diamond cutting tool or the mold base in a direction of a rotation axis of the mold,
        a second step of cutting the mold base while relatively driving the diamond cutting tool or the mold base in a direction perpendicular to the rotation axis of the mold, and
        a third step of cutting the mold base by displacing the diamond cutting tool or the mold base simultaneously in a direction of the rotation axis of the mold and a direction perpendicular to the rotation axis of the mold while relatively driving the diamond cutting tool or the mold base, between the first and the second steps, and
    wherein each of the ring-shaped zones of the optical element comprises a second groove comprising a top surface having the predetermined width extending in a radius direction of the ring-shaped zones, a side surface, and a curved surface with a curvature radius in a range from 0.5 μm to 2 μm connecting the top surface and the side surface.

2. The method of claim 1, wherein the mold base is cut in the third step such that the bottom surface and a side surface are connected by a predetermined curved surface in the groove, and a curvature radius of the curved surface is in a range from 0.5 μm to 2 μm.

3. The method of claim 1, wherein the mold has a lower deviation between a surface formed at the start of cutting and a surface formed at the end of cutting than that of a mold prepared by the preparing step without the third step.

4. A method for manufacturing an optical element having an optical surface including a plurality of ring-shaped zones formed concentrically around an optical axis, comprising:
    preparing a mold for forming an optical element, wherein the mold comprises a mold base on which a plurality of first grooves are formed concentrically by relatively driving a diamond cutting tool and the mold base for cutting the mold base, the diamond cutting tool comprising a cutting edge comprising a cutting face comprising a first edge portion, a second edge portion, and a third edge portion crossing first edge portion and the second edge portion being in a line shape and extending parallel to each other, the mold base being driven to be rotated, each of the first grooves comprising a bottom surface having a predetermined width extending in a radius direction of the first grooves and a first side surface,
    providing the mold with a material of the optical element, and
    molding the material into the optical element,
    wherein the preparing step comprises:
        a first step of cutting the bottom surface of each of the first grooves on the mold base by the third edge portion of the diamond cutting tool by relatively driving the diamond cutting tool or the mold base in a direction of the rotation axis of the mold;
        a second step of cutting the first side surface on the mold base by the second edge portion of the diamond cutting tool by relatively driving the diamond cutting tool or the mold base in a direction perpendicular to the rotation axis of the mold; and
        a third step of cutting the mold base by displacing the diamond cutting tool or the mold base simultaneously in the direction of the rotation axis of the mold and the direction perpendicular to the rotation axis of the mold, between the first and second steps,
    wherein each of the ring-shaped zones of the optical element comprises a second groove comprising a top surface having the predetermined width extending in a radius direction of the ring-shaped zones, a second side surface, and a curved surface with a curvature radius in a range from 0.5 μm to 2 μm connecting the top surface and the second side surface.

5. The method of claim 4, wherein the mold base is cut in the third step such that the bottom surface and a side surface are connected by a predetermined curved surface in the groove, and a curvature radius of the curved surface is in a range from 0.5 μm to 2 μm.

6. The method of claim 4, wherein the mold has a lower deviation between a surface formed at the start of cutting and a surface formed at the end of cutting than that of a mold prepared by the preparing step without the third step.

* * * * *